United States Patent
Sekine

(10) Patent No.: US 9,088,026 B2
(45) Date of Patent: Jul. 21, 2015

(54) ADHESIVE MATERIAL FOR FUEL CELL AND FUEL CELL

(75) Inventor: Shinobu Sekine, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 13/579,175

(22) PCT Filed: Apr. 1, 2010

(86) PCT No.: PCT/JP2010/002413
§ 371 (c)(1),
(2), (4) Date: Aug. 15, 2012

(87) PCT Pub. No.: WO2011/125088
PCT Pub. Date: Oct. 13, 2011

(65) Prior Publication Data
US 2013/0040221 A1 Feb. 14, 2013

(51) Int. Cl.
*H01B 1/12* (2006.01)
*H01M 8/10* (2006.01)
*H01M 4/86* (2006.01)
*C09J 9/02* (2006.01)
*C09J 11/00* (2006.01)
*C08K 7/16* (2006.01)

(52) U.S. Cl.
CPC .............. *H01M 8/1004* (2013.01); *C09J 9/02* (2013.01); *C09J 11/00* (2013.01); *H01M 4/8605* (2013.01); *C08K 7/16* (2013.01); *C09J 2203/33* (2013.01); *Y02E 60/521* (2013.01)

(58) Field of Classification Search
None
See application file for complete search history.

(56) References Cited

U.S. PATENT DOCUMENTS

| | | |
|---|---|---|
| 2004/0053113 A1 | 3/2004 | Nishikawa et al. |
| 2005/0031933 A1 | 2/2005 | Blunk et al. |
| 2007/0077475 A1 | 4/2007 | Lai et al. |
| 2008/0274407 A1 | 11/2008 | Bourcier et al. |
| 2010/0291467 A1* | 11/2010 | Ji et al. .......................... 429/483 |

FOREIGN PATENT DOCUMENTS

| | | |
|---|---|---|
| CN | 101210158 A | 7/2008 |
| JP | A-63-040261 | 2/1988 |
| JP | A-2000-173631 | 6/2000 |
| JP | A-2002-260686 | 9/2002 |
| JP | A-2003-203646 | 7/2003 |
| JP | A-2003-282088 | 10/2003 |
| JP | A-2004-214045 | 7/2004 |
| JP | A-2005-183232 | 7/2005 |
| JP | A-2005-200620 | 7/2005 |
| JP | A-2005-285569 | 10/2005 |
| JP | A-2006-294559 | 10/2006 |
| JP | A-2007-501500 | 1/2007 |
| JP | A-2008-091207 | 4/2008 |

OTHER PUBLICATIONS

International Search Report issued in Application No. PCT/JP2010/002413; Dated Jul. 6, 2010.

* cited by examiner

*Primary Examiner* — Barbara Gilliam
*Assistant Examiner* — Adam A Arciero
(74) *Attorney, Agent, or Firm* — Oliff PLC

(57) ABSTRACT

An adhesive material is used to bond between layers of a fuel cell. The adhesive material includes an adhesive resin, conductive particles and a conductive resin.

4 Claims, 4 Drawing Sheets

ADHESIVE MATERIAL FOR FUEL CELL AND FUEL CELL

BACKGROUND

1. Technical Field

The present invention relates to an adhesive material used to bond between layers of a fuel cell, and a fuel cell having layers bonded by the adhesive material.

2. Background Art

The fuel cell generally has the structure, in which a membrane electrode assembly (hereinafter referred to as "MEA") obtained by forming (applying) catalyst layers on respective surfaces of an electrolyte membrane is placed between a pair of gas diffusion layers having water repellent layers formed thereon. One conventionally known method of manufacturing the fuel cell adsorbs fluoropolymer in carbon to form water repellent layers, places the water repellent layers between an MEA and gas diffusion layers, and then manufactures the fuel cell with layers bonded by thermal compression bonding (hot press).

SUMMARY

This proposed method may, however, cause vaporization of water contained in the respective layers of the fuel cell by heat of thermal compression bonding, which may result in deformation or degradation of the dried layers. Thermal compression bonding also causes the electrolyte membrane in the dried and compressed state to be bonded to other layers, so that a large internal stress is likely to occur in the electrolyte membrane by water absorption during operation of the fuel cell after bonding. The proposed method bonds between the layers mainly by diffusion and entanglement of thermally moving ionomer between the layers. Pressure bonding at ambient temperature that is lower than the glass transition temperature of the ionomer thus results in insufficient adhesive strength. Additionally, the high electron conductivity (i.e., low electrical resistance) is required in bonding between the layers of the fuel cell.

In order to solve at least part of the foregoing, the object of the invention is to provide the technique of ensuring both the adhesiveness and the electron conductivity between the layers of a fuel cell produced even by pressure bonding at ambient temperature.

In order to achieve at least part of the foregoing, the invention provides various aspects and embodiments described below.

First aspect: According to a first aspect of the invention, there is provided an adhesive material used to bond between layers of a fuel cell. The adhesive material comprises an adhesive resin, conductive particles and a conductive resin.

The adhesive material according to this aspect comprises the adhesive resin, the conductive resin and the conductive particles. This adhesive material accordingly has adherence and increases the adhesiveness and the entanglement density between the polymer materials in the layers of the fuel cell produced even by pressure bonding at ambient temperature, so as to enable strong bonding between the layers of the fuel cell. When the adhesive material containing only the conductive particles as the conductive material is used to bond between the layers of the fuel cell, there may be poor adhesiveness between the layers. The adhesive material of this aspect, however, contains the conductive resin in addition to the conductive particles as the conductive material and thus ensures both the adhesiveness and the electron conductivity between the layers of the fuel cell.

Second aspect: In the adhesive material according to the first aspect, the conductive particles have an average diameter that is greater than an average diameter of a catalyst support of the fuel cell.

In the adhesive material according to this aspect, the average diameter of the conductive particles is greater than the average diameter of the catalyst support in the fuel cell, so that the cohesive material, which includes the adhesive resin and the conductive resin and is located around the conductive particles in the adhesive material has difficulty in entering the cavities in the catalyst layers. Using this adhesive material to bond between the layers of the fuel cell thus advantageously prevents reduction of the gas diffusivity and thereby prevents performance degradation of the fuel cell.

Third aspect: In the adhesive material according to either one of the first aspect and the second aspect, the adhesive resin in the adhesive material has concentration of 35% or higher.

The adhesive material of this aspect has the good adhesiveness.

Fourth aspect: In the adhesive material according to the third aspect, the conductive particles in the adhesive material have concentration of 3% or lower.

The adhesive material of this aspect is made paste that is easily applicable on the layers of the fuel cell.

Fifth aspect: In the adhesive material according to the fourth aspect, the conductive resin in the adhesive material has concentration of 50% or higher.

The adhesive material of this aspect is adequately used to bond between the layers of the fuel cell operated at high temperature without humidification.

The present invention may be actualized by diversity of applications, for example, an adhesive material for fuel cell, a fuel cell, a fuel cell system, and a manufacturing method of the fuel cell or the fuel cell system.

DESCRIPTION OF EMBODIMENTS

A. Structure of Fuel Cell

Figure 1:
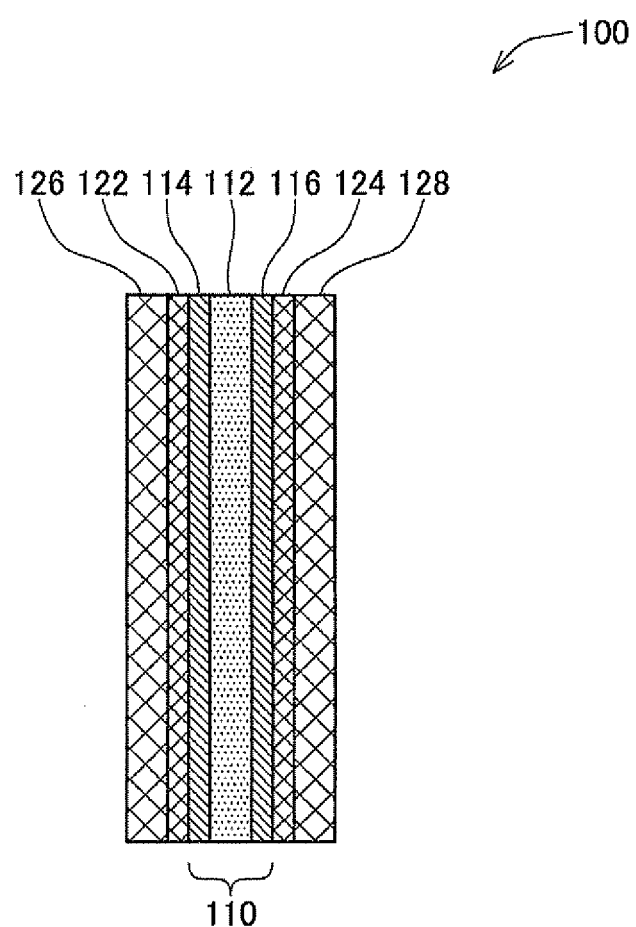
FIG. 1 schematically illustrates the cross sectional structure of a fuel cell 100, to which an adhesive material is applicable, according to one embodiment of the invention.

FIG. 1 schematically illustrates the cross sectional structure of a fuel cell 100, to which an adhesive material is applicable, according to one embodiment of the invention. The fuel cell 100 includes a membrane electrode assembly (hereinafter referred to as "MEA") 110 and water repellent layers (water repellent layers 122 and 124) and gas diffusion layers (gas diffusion layers 126 and 128) formed on the respective surfaces of the MEA 110. The MEA 110 is constructed by forming (applying) catalyst layers (catalyst layers 114 and 116) on the respective surfaces of an electrolyte membrane 112. In general, the fuel cell 100 is used in a stack structure including a plurality of fuel cells stacked across separators (not shown).

The fuel cell 100 according to this embodiment is a polymer electrolyte fuel cell. The electrolyte membrane 112 is an ion exchange membrane made of a solid polymer material, for example, perfluorocarbon sulfonic acid-based fluororesin and has good proton conductivity in the wet state. The catalyst layers 114 and 116 contain platinum or a platinum alloy as the catalyst. More specifically, the catalyst layers 114 and 116 contain carbon particles with the catalyst supported thereon and an electrolyte material (ionomer).

The gas diffusion layers 126 and 128 are gas-permeable conductive members and serve as flow paths to supply reaction gases (hydrogen-containing fuel gas and oxygen-containing oxidizing gas) to the MEA 110. The gas diffusion layers 126 and 128 may be made of carbon paper, carbon cloth, metal mesh or metal foam.

The water repellent layers 122 and 124 are formed on the surfaces of the gas diffusion layers 126 and 128 facing the MEA 110. The water repellent layers 122 and 124 are formed from carbon particles and resin particles of a water-repellent resin, such as polytetrafluoroethylene (PTFE) and serve to accelerate removal of the excess water content from the MEA 110 and the gas diffusion layers 126 and 128.

B. Method of Manufacturing Fuel Cell

The fuel cell 100 according to the embodiment is manufactured by the following procedure. The procedure first prepares the MEA 110 and the gas diffusion layers 126 and 128 with the water repellent layers 122 and 124 formed thereon. The procedure then applies an adhesive material on at least one of the surfaces of the MEA 110 (i.e., the surfaces of the catalyst layers 114 and 116) and the surfaces of the gas diffusion layers 126 and 128 with the water repellent layers 122 and 124 formed thereon.

The adhesive material used here is cohesive paste material prepared by mixing an adhesive resin and a conductive resin with a solvent and further adding conductive carbon as conductive particles to the mixture to be adsorbed and dispersed. The adhesive resin may be, for example, M-300 manufactured by Toagosei Co., Ltd., and the conductive resin may be, for example, Enocoat bp 105 manufactured by Chemitrek Company. The conductive carbon may be, for example, Ketjen Black EC-600JD manufactured by Ketjen Black International Company. The solvent may be, for example, ethanol.

After application of the adhesive material, the MEA 110 and the gas diffusion layers 126 and 128 with the water repellent layers 122 and 124 formed thereon are stacked and pressure bonded at ambient temperature (e.g., 20° C.±15° C.). The fuel cell 100 (FIG. 1) having the bonded layers is produced by this process.

Figure 2A:
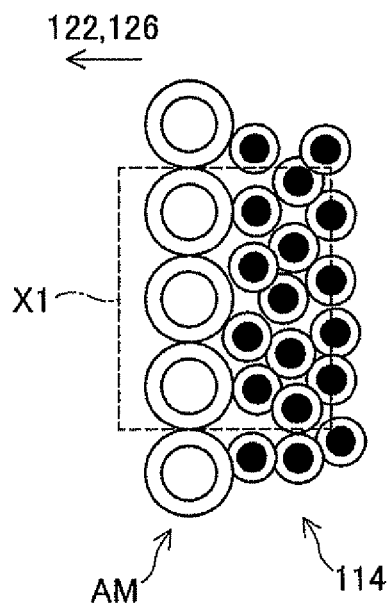
FIGS. 2A and 2B schematically illustrate the state of adhesive interface between the catalyst layer and the gas diffusion layer.
Figure 2B:
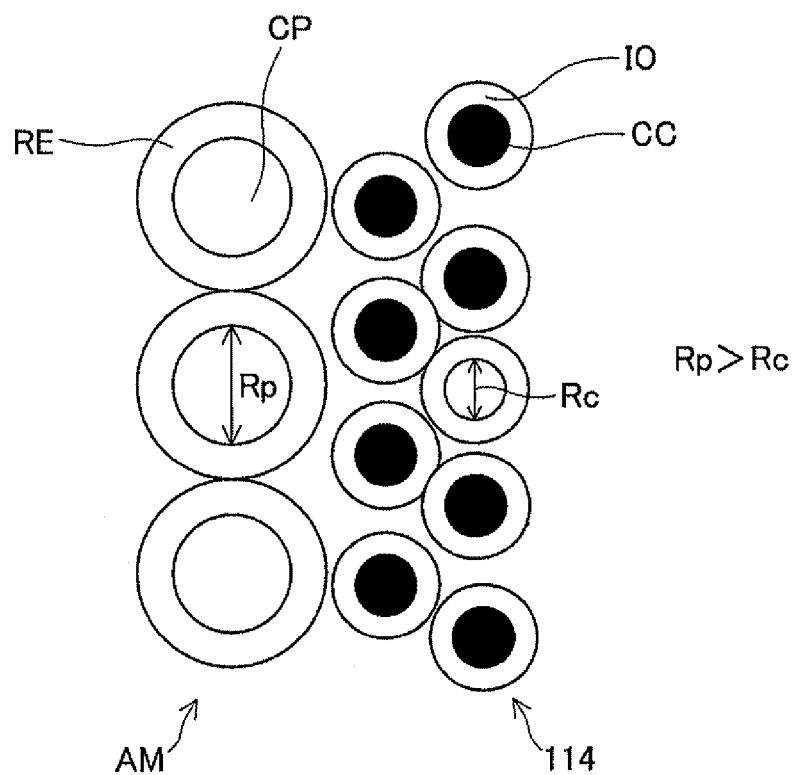

FIGS. 2A and 2B schematically illustrate the state of adhesive interface between the catalyst layer and the gas diffusion layer. FIG. 2A shows adhesive material AM located between the catalyst layer 114 and the water repellent layer 122 and the gas diffusion layer 126 on either the anode side or the cathode side. FIG. 2B is an enlarged view of X1 area of FIG. 2A. As illustrated in FIG. 2B, the catalyst layer 114 includes carbon particles CC working as the catalyst support and ionomer IO located around the carbon particles CC. The adhesive material AM includes conductive carbon CP and cohesive material RE that is made of adhesive resin and conductive resin and is located around the conductive carbon CP.

According to this embodiment, as shown in FIG. 2B, average particle size Rp of the conductive carbon CP included in the adhesive material AM is greater than average particle size Re of the carbon particles CC as the catalyst support in the catalyst layer 114. When the average particle size Rp of the conductive carbon CP in the adhesive material AM is equal to or smaller than the average particle size Rc of the carbon particles CC as the catalyst support, the cohesive material RE located around the conductive carbon CP in the adhesive material AM is likely to enter the cavities in the catalyst layer 114. Filling the cavities in the catalyst layer 114 with the cohesive material RE may reduce the gas diffusivity. According to this embodiment, however, the average particle size Rp of the conductive carbon CP in the adhesive material AM is greater than the average particle size Rc of the carbon particles CC as the catalyst support, so that the cohesive material RE located around the conductive carbon CP in the adhesive material AM is unlikely to enter the cavities in the catalyst layer 114. Even when the adhesive material including the adhesive resin, the conductive resin and the conductive carbon is used to bond between the catalyst layers and the gas diffusion layers, such size control advantageously prevents reduction of the gas diffusivity and thereby prevents performance degradation of the fuel cell.

As described above, according to the embodiment, the adhesive material used to bond between the layers of the fuel cell 100 (more specifically, between the catalyst layers 114 and 116 of the MEA 110 and the gas diffusion layers 126 and 128 with the water repellent layers 122 and 124 formed thereon) includes the adhesive resin, the conductive resin and the conductive carbon. This adhesive material accordingly has adherence and thereby increases the adhesiveness and the entanglement density between the polymer materials in the layers of the fuel cell 100 produced even by pressure bonding at ambient temperature. The adhesive material ensures strong adhesion between the layers of the fuel cell 100, irrespective of the type of the ionomer, the type of the catalyst, or the type of the gas diffusion layer.

According to this embodiment, using the adhesive material described above enables the fuel cell 100 having the strongly bonded layers to be manufactured by pressure bonding at ambient temperature. This advantageously prevents water contained in the respective layers of the fuel cell from being vaporized by heat and thereby prevents deformation or degradation of the respective layers by drying.

Figure 3:
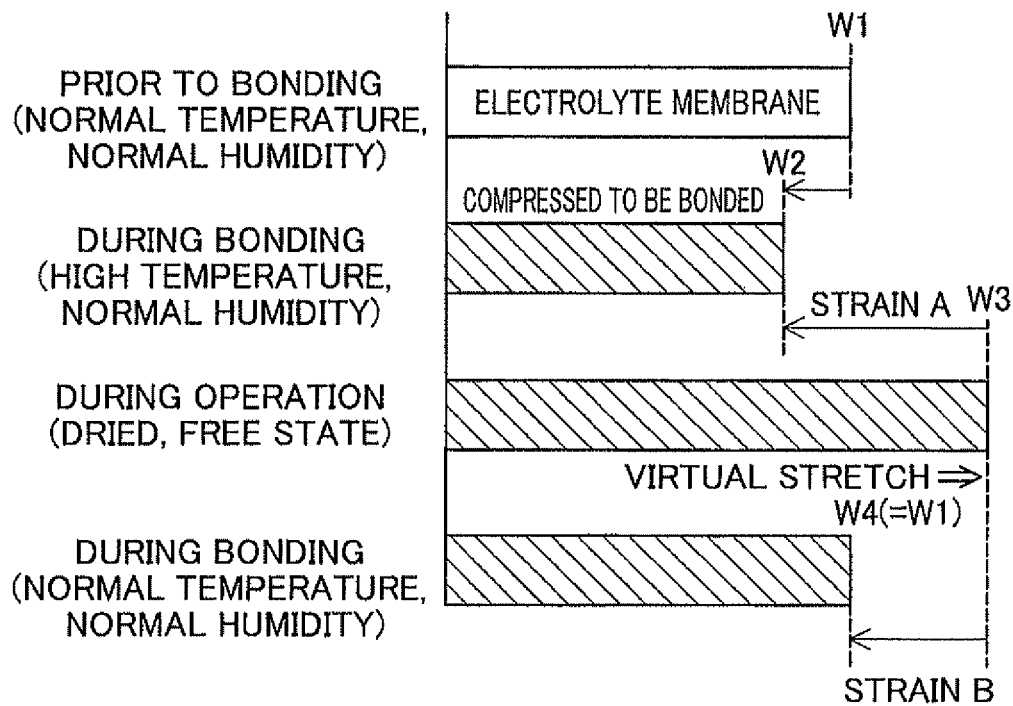
FIG. 3 shows varying widths W of the electrolyte membrane in various states.

According to this embodiment, using the adhesive material described above enables the fuel cell 100 having the strongly bonded layers to be manufactured by pressure bonding at ambient temperature. This also reduces the internal stress produced in the electrolyte membrane 112 and thereby further enhances the adhesion between the layers of the fuel cell 100. FIG. 3 shows varying widths W of the electrolyte membrane 112 in various states. The topmost drawing of FIG. 3 shows the electrolyte membrane 112 of width W1 prior to adhesive bonding under the condition of normal temperature and normal humidity (e.g., absolute humidity of 65%±20%). The bottommost drawing of FIG. 3 shows the electrolyte membrane 112 of width W4 during adhesive bonding of the fuel cell 100 by pressure bonding at ambient temperature. The width W1 is substantially equal to the width W4. The second top drawing of FIG. 3 shows the electrolyte membrane 112 of width W2 during adhesive bonding of the fuel cell 100 by thermal compression bonding (hot press). The second bottom drawing of FIG. 3 shows the electrolyte membrane 112 of virtual width W3 on the assumption that the electrolyte membrane 112 in the free state (unstrained state) absorbs water and swells during operation of the fuel cell 100 after the adhesive bonding. As shown in FIG. 3, when thermal compression bonding is employed to bond the fuel cell 100, an internal strain (strain A in the drawing) corresponding to the difference between the width W3 and the width W2 occurs in the electrolyte membrane 112 during operation of the fuel cell 100. When pressure bonding at ambient temperature is employed to bond the fuel cell 100, on the other hand, an internal strain (strain B in the drawing) corresponding to the difference between the width W3 and the width W4 occurs in the electrolyte membrane 112 during operation of the fuel cell 100. As clearly understood from FIG. 3, the stain B is less than the strain A. The internal stress of the electrolyte membrane 112 is proportional to the internal strain. Pressure bonding at ambient temperature to bond the fuel cell 100 accordingly reduces the internal stress produced in the electrolyte membrane during operation of the fuel cell 100 and thereby enhances the adhesion between the layers of the fuel cell 100, compared with thermal compression bonding.

According to this embodiment, the adhesive material used to bond between the layers contains the conductive resin in addition to conductive carbon, as the conductive material. This ensures the electron conductivity between the layers of the fuel cell 100, while providing the adhesion between the layers. In other words, when the adhesive material contains only conductive carbon as the conductive material, simply increasing the concentration of conductive carbon (i.e., content of conductive carbon relative to the total amount of the adhesive material; the same shall apply hereinafter) to ensure the electron conductivity fails to make the paste of the adhesive material. Additionally increasing the concentration of the solvent to make the paste of the adhesive material does not sufficiently enhance the adhesion between the layers of the fuel cell 100. According to this embodiment, however, the electron conductivity between the layers is ensured not by increasing the concentration of conductive carbon in the adhesive material but by adding the conductive resin to the adhesive material. This provides the adhesive material that ensures both the adhesion and the electron conductivity between the layers.

According to this embodiment, the adhesive material used to bond between the layers of the fuel cell 100 has adherence and thereby ensures the stronger adhesion between the layers by pressure bonding with lower pressure, compared with general thermal compression bonding. This prevents the pores in the catalyst layers 114 and 116 from being crushed to reduce the gas diffusivity, while preventing through holes from being formed in the MEA 110 by the surface roughness of the gas diffusion layers 126 and 128 to cause gas leakage. The thickness of the adhesive material layer in the fuel cell 100 is sufficiently smaller than the diameter of the support in the catalyst layers 114 and 116. This advantageously prevents the adhesive material from closing the pores in the catalyst layers 114 and 116 to interfere with the gas diffusivity.

C. Performance Evaluation
C1. First Performance Evaluation

Adhesive materials for fuel cell were prepared as Examples according to the embodiment described above and were evaluated together with Comparative Examples for performances. Table 1 shows the compositions (concentrations of the respective components) of the adhesive materials in Examples and Comparative Examples. In this performance evaluation, Enocoat BP105 manufactured by Chemitrek Company was used as the conductive resin; M-300 manufactured by Toagosei Co., Ltd. was used as the adhesive resin; ethanol was used as the solvent; and Ketjen Black EC-600JD manufactured by Ketjen Black International Company was used as the conductive carbon.

TABLE 1

|  | Comp. EX 1 | Comp. EX 2 | Comp. EX 3 | Comp. EX 4 | Comp. EX 5 | EX 1 | EX 2 |
| --- | --- | --- | --- | --- | --- | --- | --- |
| Conductive Resin | — | — | — | — | — | 25% | 50% |
| Adhesive Resin | 50% | 35% | 20% | 35% | 35% | 35% | 35% |
| Solvent | 50% | 65% | 80% | 62.5% | 60% | 37.5% | 12.5% |
| Conductive Carbon | — | — | — | 2.5% | 5% | 2.5% | 2.5% |
| Total | 100% | 100% | 100% | 100% | 100% | 100% | 100% |

As shown in Table 1, the adhesive materials of Examples 1 and 2 contained all the conductive resin, the adhesive resin, the solvent and the conductive carbon. The adhesive materials of Comparative Examples 1, 2, and 3 contained the adhesive resin and the solvent but did not contain the conductive resin or the conductive carbon. The adhesive materials of Comparative Examples 4 and 5 contained the adhesive resin, the solvent and the conductive carbon but did not contain the conductive resin.

For the first performance evaluation, with respect to each of the adhesive materials of Examples and Comparative Examples, a pair of gas diffusion layers (manufactured by SGL Carbon Corp., size of 11.5 mm in length×11.5 mm in width) with the water repellent layers formed thereon were provided. A small volume (0.02 ml) of the adhesive material was applied on the water repellent layer-side surface of one of the gas diffusion layers and was dried at 80° C. for 1 hour. The other gas diffusion layer was bonded to the one gas diffusion layer with the adhesive material, such that the respective water repellent layers faced each other. A laminated body was obtained by applying a load of about 1 kgf at ambient temperature for 10 seconds. As Comparative Example 6, a Nation solution (Nation: registered trademark by DuPont) was provided and used in place of the adhesive material, and a laminated body was prepared by the same procedure.

Table 2 shows the results of first performance evaluation. The first performance evaluation included evaluation of whether paste was made (pasting evaluation), evaluation of whether the high adhesion strength was obtained (adhesiveness evaluation) and evaluation of whether the high electron conductivity was ensured (electrical resistivity measurement). In the pasting evaluation field of Table 2, the circle indicates successful pasting and the cross indicates failed pasting. The adhesiveness evaluation test lifted up the laminated body prepared from the adhesive material (or Nafion solution) in each of Examples and Comparative Examples with tweezers and free-fell the laminated body from the height of 30 cm to check whether the pair of gas diffusion layers were separated from each other. In the adhesiveness evaluation field of Table 2, the circle indicates no separation of the gas diffusion layers, and the cross indicates separation of the gas diffusion layers. The electrical resistivity measurement measured the value of electrical resistance in the thickness direction of the laminated body by AC impedance method to determine the electrical resistivity.

TABLE 2

|  | Comp. EX 1 | Comp. EX 2 | Comp. EX 3 | Comp. EX 4 | Comp. EX 5 | Comp. EX 6 | EX 1 | EX 2 |
|---|---|---|---|---|---|---|---|---|
| Pasting | ○ | ○ | ○ | ○ | x | — | ○ | ○ |
| Adhesiveness | ○ | ○ | x | ○ | — | x | ○ | ○ |
| Electrical Resistivity ($\Omega \cdot cm$) | 0.60 | 0.56 | 0.56 | 0.46 | — | 0.46 | 0.40 | 0.36 |

With referring to the results of Comparative Examples 1, 2 and 3, from the standpoint of adhesiveness, the concentration of the adhesive resin is preferably not less than 35%. The adhesive material of Comparative Example 3 had the concentration of the adhesive resin of less than 35% (i.e., 20%) and had the poor result in the adhesiveness evaluation. The adhesive materials of Comparative Examples 1 and 2, on the other hand, had the concentration of the adhesive resin of not less than 35% and had the good result in the adhesive evaluation. The adhesive materials of Comparative Examples 1, 2 and 3, however, contained neither the conductive resin nor the conductive carbon, so that the laminated bodies prepared from the adhesive materials of Comparative Examples 1, 2 and 3 had relatively large values of electrical resistivity and failed to provide the high electron conductivity.

With referring to the results of Comparative Examples 4 and 5, the concentration of the conductive carbon (i.e., the solid content) is preferably not greater than 3%, in order to make the paste of the adhesive material that is applicable to the gas diffusion layer. The adhesive material of Comparative Example 5 had the concentration of the conductive carbon of greater than 3% (i.e., 5%) and failed to make the paste. The adhesive material of Comparative Example, 4, on the other hand, had the concentration of the conductive carbon of not greater than 3% (i.e., 2.5%) and succeeded in making the paste. The adhesive material of Comparative Example 4 also had the concentration of the adhesive resin of not less than 35% and had the good result in the adhesiveness evaluation. The adhesive material of Comparative Example 4, however, contained no conductive resin, so that the laminated body prepared from the adhesive material of Comparative Example 4 had still the relatively large value of electrical resistivity, although not being smaller than those of Comparative Examples 1, 2, and 3, and failed to provide the high electron conductivity.

The laminated body of Comparative Example 6 prepared using the Nafion solution had poor result in the adhesiveness evaluation and failed to provide the high electron conductivity.

The adhesive materials of Examples 1 and 2, on the other hand, had the concentration of the conductive carbon of not greater than 3% (i.e., 2.5%) and succeeded in making the paste. The adhesive materials of Examples 1 and 2 also had the concentration of the adhesive resin of not less than 35% and had the good result in the adhesiveness evaluation. Additionally, the adhesive materials of Examples 1 and 2 contained the conductive resin and had the smaller values of electrical resistivity than those of Comparative Examples and thereby succeeded in providing the high electron conductivity.

C2. Second Performance Evaluation

Figure 4:
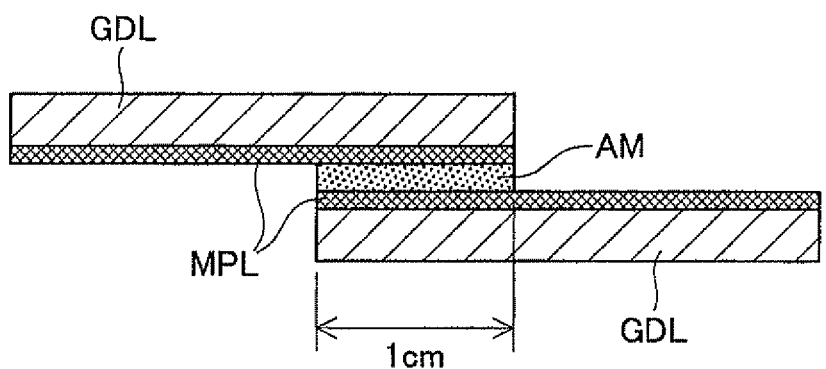
FIG. 4 schematically illustrates the structure of a laminated body used for second performance evaluation.
Figure 5A:
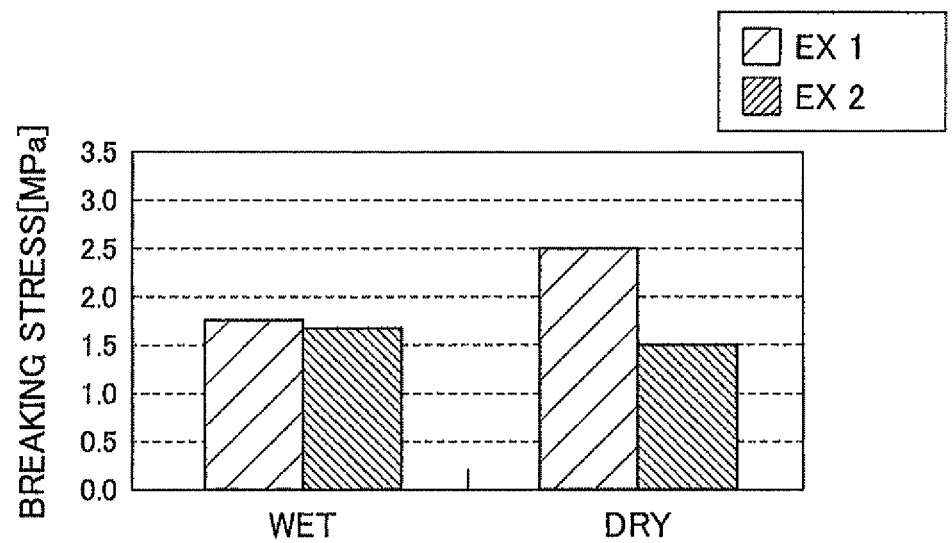
FIGS. 5A and 5B show the results of second performance evaluation.
Figure 5B:
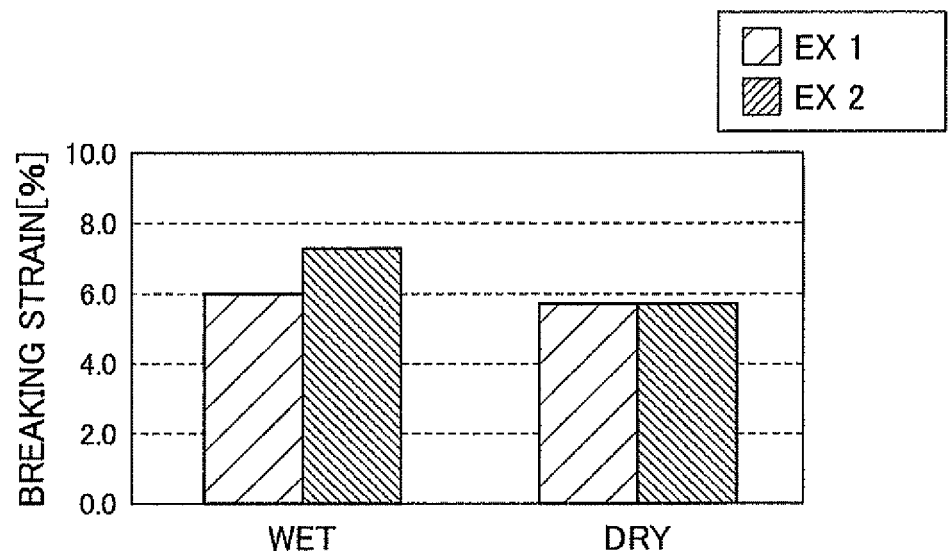

FIG. 4 schematically illustrates the structure of a laminated body used for second performance evaluation. FIGS. 5A and 5B show the results of second performance evaluation. The second performance evaluation was performed for the adhesive materials of Examples 1 and 2 described above. An adhesive material AM was applied to the edges (of 1 cm in width) of a pair of gas diffusion layers GDL with water repellent layers MPL formed thereon. A laminated body was prepared by stacking the pair of gas diffusion layers GDL, such that the respective edges with the adhesive material AM were overlapped with each other. A tensile test sample was obtained by cutting out the laminated body to a dumbbell shape and was evaluated for adhesive strength. FIG. 5A shows the measurement results of breaking stress in the wet state (WET) and in the dried state (DRY). FIG. 5B shows the measurement results of breaking strain in the wet state and in the dried state.

As shown in FIGS. 5A and 5B, the laminated body prepared from the adhesive material of Example 1 had the higher breaking stress in the dry state than that in the wet state. The preferable adhesive material used to bond between the layers of the fuel cell reduces the stress or strain internally occurring when the electrolyte membrane is dried to be compressed and absorbs water to swell. From this standpoint, the adhesive material of Example 1 is preferably applied to the fuel cell including an electrolyte membrane that is likely to be compressed in the dry state. The laminated body prepared from the adhesive material of Example 2, on the other hand, had the higher breaking strain in the wet state than that in the dry state. The adhesive material of Example 2 is thus preferably applied to the fuel cell including a highly swellable electrolyte membrane (having high degree of swelling).

In general, the fuel cell produces heat accompanied with power generation and is accordingly cooled down by a cooling system. Operating the fuel cell at high temperature (e.g., 80° C. or higher) increases the cooling efficiency and enables size reduction and simplification of the cooling system and thereby size reduction and simplification of the whole fuel cell system. During high-temperature operation of the fuel cell with no humidification, the electrolyte membrane tends to have large water-absorbing linear expansion. The adhesive material of Example 2 that swells accompanied with swelling the electrolyte membrane is thus preferably applied to reduce the internal stress of the electrolyte membrane. With referring to Table 1, in order to bond between the layers of the fuel cell that is operated at high temperature without humidification, it is preferable to use the adhesive material containing the conductive resin, the adhesive resin and the conductive carbon and having the concentration of the adhesive resin of not less than 35%, the concentration of the conductive carbon of not greater than 3% and the concentration of the conductive resin of not less than 50%.

When the electrolyte membrane used tends to be compressed in dry state, it is preferable to use the adhesive material containing the conductive resin, the adhesive resin and the conductive carbon and having the concentration of the adhesive resin of not less than 35%, the concentration of the conductive carbon of not greater than 3% and the concentration of the conductive resin of not greater than 25%.

D. Modifications

The invention is not limited to the above embodiment or examples, but a multiplicity of variations and modifications may be made to the embodiment without departing from the scope of the invention. Some examples of possible modification are described below.

D1. Modification 1

The structure of the fuel cell 100 according to the above embodiment is only illustrative, and the structure of the fuel cell 100 may be changed and modified in various ways. For example, the materials of the respective layers of the fuel cells 100 are not limited to the materials specified in the above embodiment but may be any other adequate materials. The conductive carbon is used as the conductive particles included in the adhesive material according to the above embodiment, but may be replaced with another type of conductive particles, such as carbon nanotubes.

According to the above embodiment, the water repellent layers 122 and 124 are formed on the surfaces of the gas diffusion layers 126 and 128 of the fuel cell 100. According to another embodiment, there are no water repellent layers 122 and 124 formed on the surfaces of the gas diffusion layers 126 and 128. In the latter application, the fuel cell with the strongly bonded layers is manufactured by applying the adhesive material at least one of the surfaces of the MEA 110 and the surfaces of the gas diffusion layers 126 and 128 and subsequently stacking the respective layers and pressure bonding the stacked layers at ordinary temperature.

D2. Modification 2

The composition (i.e., concentrations of the respective components) of the adhesive material according to the embodiment is only illustrative and not restrictive in any sense. Any adhesive material containing the adhesive resin, the conductive particles and the conductive resin can provide both the adhesiveness and the electron conductivity between the layers of the fuel cell produced even by pressure bonding at ambient temperature. In the adhesive material AM according to the above embodiment, the average particle size $R_p$ of the conductive carbon CP is greater than the average particle size $R_c$ of the carbon particles CC as the catalyst support. The magnitude relationship of the particle size is, however, not limited to this embodiment.

What is claimed is:

1. A fuel cell, comprising:
an electrolyte membrane;
catalyst layers provided on opposing surfaces of the electrolyte membrane; and
gas diffusion layers configured to supply reaction gases to the catalyst layers, the gas diffusion layers being provided on surfaces of the catalyst layers opposed to respective surfaces of the catalyst layers facing the electrolyte membrane, wherein:
the catalyst layers and the gas diffusion layers are bonded by an adhesive material, and
the adhesive material contains an adhesive resin, conductive particles, and a conductive resin, wherein the conductive particles have an average diameter that is greater than an average diameter of catalyst support particles in the catalyst layers, and wherein the adhesive resin and the conductive resin are present in the adhesive material in the form of a coating layer located on a surface of each of the conductive particles.

2. The fuel cell according to claim 1, wherein the concentration of the conductive particles in the adhesive material is 3% or lower.

3. The fuel cell according to claim 2, wherein the concentration of the conductive resin in the adhesive material is 50% or higher.

4. The fuel cell according to claim 1, wherein the concentration of the adhesive resin in the adhesive material is 35% or higher.

\* \* \* \* \*